United States Patent
Sherazi et al.

(10) Patent No.: US 11,379,434 B2
(45) Date of Patent: Jul. 5, 2022

(54) EFFICIENT AND AUTOMATIC DATABASE PATCHING USING ELEVATED PRIVILEGES

(71) Applicant: JPMorgan Chase Bank, N.A., New York, NY (US)

(72) Inventors: Mustafa Sherazi, Houston, TX (US); Barath Thankappan, Columbus, OH (US); Christopher Festa, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 533 days.

(21) Appl. No.: 16/410,558

(22) Filed: May 13, 2019

(65) Prior Publication Data

US 2020/0364192 A1 Nov. 19, 2020

(51) Int. Cl.
*G06F 8/65* (2018.01)
*G06F 16/21* (2019.01)
*G06F 11/07* (2006.01)
*H04L 9/40* (2022.01)
*G06F 9/445* (2018.01)

(52) U.S. Cl.
CPC ............... *G06F 16/21* (2019.01); *G06F 8/65* (2013.01); *G06F 9/44505* (2013.01); *G06F 11/0793* (2013.01); *H04L 63/08* (2013.01)

(58) Field of Classification Search
CPC ............... G06F 8/61; G06F 8/63; G06F 8/65
See application file for complete search history.

(56) References Cited

U.S. PATENT DOCUMENTS

| | | | |
|---|---|---|---|
| 2008/0163192 A1 | 7/2008 | Jha et al. | |
| 2014/0123125 A1 | 5/2014 | Inamdar | |
| 2015/0142728 A1* | 5/2015 | Nigam | G06F 8/65 707/609 |
| 2016/0019043 A1* | 1/2016 | Ramasamy | G06F 8/65 717/171 |
| 2016/0085543 A1* | 3/2016 | Islam | G06F 11/1438 717/171 |
| 2021/0081190 A1* | 3/2021 | Fagiani | H04L 9/0891 |

OTHER PUBLICATIONS

Notification of Transmittal of the International Search Report and the Written Opinion of the International Searching Authority, or the Declaration; PCT International Search Report; and PCT Written Opinion in corresponding International Application No. PCT/US20/32475, dated Jul. 30, 2020.

* cited by examiner

*Primary Examiner* — Duy Khuong T Nguyen
(74) *Attorney, Agent, or Firm* — Greenblum & Bernstein, P.L.C.

(57) ABSTRACT

Systems and methods for improved database patching are provided. Exemplary embodiments may receive a database patching request and access patching instructions related to the database patching request. A configuration file based on the patching instructions may then be generated at a patching server. A controller may then execute a command at the patching server which causes the patching server to establish a direct connection to a client database and transmit the configuration file to the client database. The controller may then execute a command which causes the client database to perform a database patching activity.

20 Claims, 3 Drawing Sheets

EFFICIENT AND AUTOMATIC DATABASE PATCHING USING ELEVATED PRIVILEGES

TECHNICAL FIELD

The present disclosure generally relates to systems and methods for efficient and automatic database patching.

BACKGROUND

Large organizations often have complex business needs requiring the management of large numbers of databases and other data repositories. The management of these databases often requires updates or other modifications to be applied to the databases in the form of database patches. Applying patches may require a number of these databases to be taken offline or otherwise become unavailable while the patch is being applied. Growing complexity and dependency between teams involved in various stages of database patching has made pushing updates and patches error prone and can lead to data security loopholes.

A typical database patching activity involves collaboration between infrastructure teams, namely system and database administrators. Planning, preparing, understanding, and availability of the underlying database systems and applications pose additional challenges to effective and efficient database patching. Database patching is critical to maintaining robust and healthy database systems and minimizing database downtime and mitigating any factors that might lead to a vulnerable or failed patch are important factors when considering patching strategy. However, these considerations may cause existing solutions to sacrifice the potential for security vulnerabilities in order to further minimize downtime. For example, third party patch deployment services may be employed to enhance security of a patching activity, however, the multiple dependencies introduced further add to the prospective downtime to complete database patching. Additionally, certain patching activities conducted using a direct secure shell (SSH) connection from a patching server to the target client database are potential security vulnerabilities and may be in violation of an organization's regulatory obligations.

It is therefore appreciated that a need exists for improved systems and methods for database patching that enhance security and minimize downtime related to the patching.

SUMMARY

In an exemplary embodiment, a method for database patching is provided. The method comprises receiving a database patching request; accessing patching instructions related to the database patching request, the patching instructions comprising at least a first patching server command and a first client database command; generating a configuration file based on the patching instructions at a patching server; executing the first patching server command which causes the patching server to establish a direct connection to a client database and transmit the configuration file to the client database; executing the first client database command which causes the client database to: perform at least one database patching activity; generate a patching output file based on the database patching activity; and, transmit the patching output file to the patching server; and, parsing the patching output file at the patching server.

In another exemplary embodiment, a system for database patching is provided. The system comprises: a patching controller configured to: receive a database patching request; access patching instructions related to the database patching request, the patching instructions comprising at least a first patching server command and a first client database command; transmit the patching instructions to a patching server causing the patching server to generate a configuration file based on the patching instructions; trigger execution of the first database command which causes the client database to establish a direct connection to a client database and transmit the configuration file to the client database; trigger execution of the first client database command which causes the client database to: perform at least one patching activity; generate a patching output file based on the database patching activity; transmit the patching output file to the patching server causing the patching server to parse the patching output file.

In yet another exemplary embodiment, a method of database patching is provided. The method comprising: receiving patching instructions from a patching controller, the patching instructions comprising at least a first patching server command and a first client database command; generating a configuration file based on the patching instructions; executing the first patching server command and establishing a direct connection to a client database; transmitting the configuration file to the client database via the direct connection; receiving a patching output file from the client database; and, parsing the patching output file.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
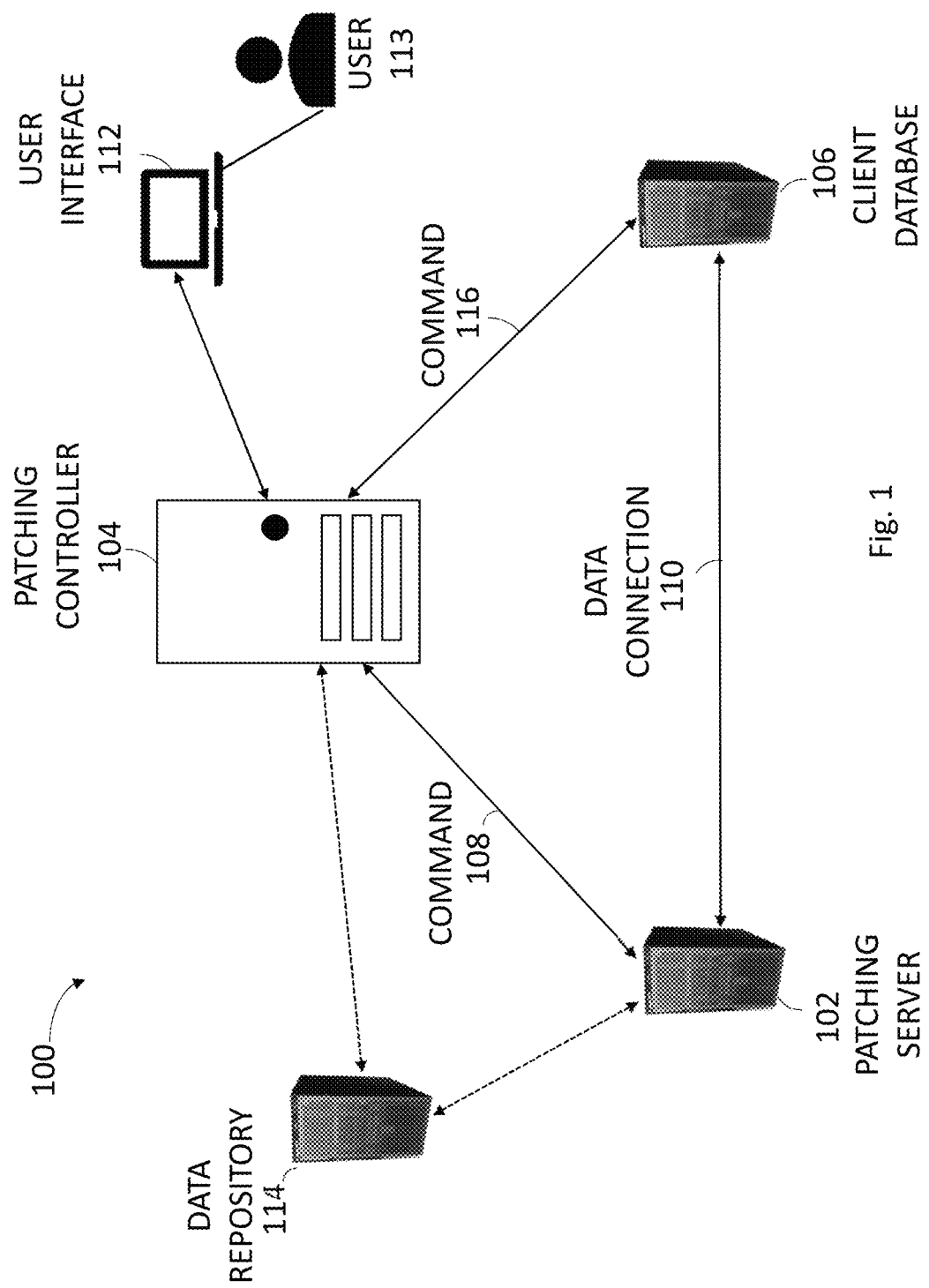
FIG. 1 shows an exemplary database patching system.

FIG. 1 shows an exemplary improved database patching system 100. The system comprises at least a patching server 102, a client database 106, and a patching controller 104. It will be appreciated that patching server 102 and client database 106 may comprise one or more computer systems, databases, servers, or the like, and are illustrated in singular form by way of example only. In some embodiments, patching server 102 may comprise one or more servers configured to deploy database patches. Client database 106 may comprise one or more databases which periodically require database patching to be applied. In certain embodiments, client database 106 may require elevated privileges to access. Patching controller 104 may comprise one or more computer systems configured to communicate with patching server 102 and client database 106. Patching controller 104 may be further operable to accept user input via an associated user interface 112. In some embodiments, patching controller 104 may be implemented via automation as a service as disclosed in U.S. patent application Ser. No. 16/249,293 filed Jan. 16, 2019, entitled "Automation as a Service" which is incorporated by reference herein, in its entirety.

Patching of client database 106 may be initiated through a database patching request. A database patching request may be generated by a user 113 at user interface 112 and associated patching controller 104. In some embodiments, a user 113 may establish an authenticated connection to the patching controller 104 via the user interface 112. In certain embodiments, the connection between patching controller 104 and user interface 112 is a secure shell (SSH) connection. In other embodiments, the connection between patching controller 104 and user interface 112 is established via a SSH connection from user interface 112 to a jumphost which then may establish a secure connection to patching controller 104. In certain embodiments, the jumphost may provide enhanced security via multi-factor authentication and/or keylogging at the user interface 112. In some embodiments, the patching controller 104 may be configured to operate as a jumphost. The enhanced security at patching controller 104 limits potential security risks associated with traditional patching execution. For example, even if an unauthorized user tried to access the patching server 102 or client database 106 using a correct password, the connection would fail because access to patching server 102 and client database 106 is controlled by controller 104.

It will be appreciated that in some embodiments user interface 112 is associated with a first computing device configured to accept user input, e.g. a desktop or laptop computer, while patching controller 104 is embodied in a second computing device. In other embodiments, user interface 112 and patching controller 104 may be associated with the same computing device. The user interface 112 may communicate with a security gateway over a network, e.g. the Internet or intranet network, in order to validate a user's entitlements or other credentials to verify that the user is permitted to generate a database patching request. In some embodiments, the patching controller 104 may limit the number of users who can access a root password to the controller, e.g. fewer than 10 users. This adds an additional layer of security for environments where data security and access to database patching capability is of increased concern.

In some embodiments, a database patching request is generated automatically. An automatically generated database patching request may be generated according to one or more factors relating to the status of client database 106. For example, if a critical error or security vulnerability has been detected at client database 106, an automatic database patching request may be generated at the client database 106 and transmitted to the patching controller 104. As another example, an automatically generated database patching request may be generated according to a predetermined time period, e.g. every six months. In certain embodiments, a trigger event may automatically generate a database patching request, however, the request will not be sent to patching controller 104 until a review has been conducted, e.g. by a user 113 at user interface 112. After a review has been conducted and the patching request has been approved, the database patching request may be sent to the patching controller 104.

After a database patching request has been received at the patching controller 104, the patching controller 104 may be configured to initiate the patching process via access of patching instructions. Patching instructions relate to the database patching request and may define parameters associated with the patching activities required to satisfy the database patching request. Patching instructions may be obtained via secure connection to a data repository 114. In some embodiments, patching instructions may be obtained via a secure connection to patching server 102. The patching controller 104 and/or patching server 102 may be configured to communicate with data repository 114, e.g. bitbucket, to access code files associated with the patching instructions. The code files stored at data repository 114 may be executable code files related to the patching server 102, e.g. server side code, and/or the client database 106, e.g. client side code. As used herein, executable code may comprise software instructions or commands, that when executed by a processor, execute functions or features associated with the instructions or commands. In some embodiments, patching controller 104 may be configured to copy files, data, code, etc. from data repository 114, and transmit the data to client database 106. In some embodiments, patching controller 104 may access additional information related to completing a sever patch, e.g. additional patching instructions, drivers, version information, etc., from the data repository 114, and copy and/or transmit the additional information to patching server 102 and/or client database 106. The patching server 102 may be configured to generate a configuration file based on the patching instructions and any associated code files. Each configuration file may comprise one or more commands, e.g. a patching server command and/or a client database command, that when executed, implement the patching activities necessary to carry out a database patch.

After the configuration file has been generated, patching controller 104 may trigger execution of at least one patching server command 108 associated with the patching server 102. Upon execution of patching server command 108, the patching server 102 may then establish a direct data connection 110 with client database 106. In some embodiments, data connection 110 may connect socket level endpoints between the patching server 102 and the client database 106. The network sockets may be opened upon execution of a first patching server command and may remain open for subsequent commands, or until patching is complete. Such embodiments may benefit from a direct, zero or near-zero latency for 1-to-1 connections and/or Secure Socket Layer (SSL) encryption. The data connection 110 may be formed directly between a single instance of patching server 102, e.g. a 1-to1 connection, or may be formed between patching server 102 and a plurality of client databases, e.g. 1-to-many connection. A 1-to-many connection allows patching to occur in environments where client database 106 comprises one or more database clusters. In some embodiments, patching server 102 may transmit the configuration file to the client database 106 via the data connection 110.

Once the configuration file is received at the client database 106, patching controller 104 may trigger execution of at least one client database command 116 at the client database 106. Execution of client database command 116 may cause executable patching instructions to be executed thereby performing a database patching activity, e.g. verifying a patching file, applying a patch to client database 106, verifying a patch has been completed, etc. In some embodiments, one or more readiness determinations, e.g. sanity checks, may be performed at client database 106 to confirm readiness to perform patching activity. Such readiness determinations may be performed automatically in response to receiving patching instructions. In some embodiments, similar readiness determinations may be made at patching servers 102. It will be appreciated that readiness determinations or similar validations may be triggered each time a configuration file or output file is transferred between the patching servers 102 and the client database 106. In certain embodiments, patching activity may be stopped and/or started based on activity at the patching server 102, client database 106, and/or at patching controller 104.

After a patching activity has been performed at client database 106, an output file may be generated. The output file is a consequence of the configuration file that was used in connection with the patching activity. In some embodiments, the output file may comprise information related to the patching activity, e.g. error reporting. The output file may be transmitted from the client database 106 to the patching server 102 via the data connection 110. In some embodiments, patching server 102 is configured to parse the output file and determine if the patching activity was successful, for example, without errors, or if additional patching activity is required.

In some embodiments, a plurality of commands must be executed sequentially due to dependencies related to the patching process. For example, a first patching activity may require a check for a file's existence, and then a subsequent command may be required to parse the contents of the file. Example commands may include, but are not limited to, trigger an explicit call to copy large files between patching server 102 and client database 106, execute custom scripts to modify the client environment, change directory structure and modify permissions, connect to database on client side to retrieve results and/or to update metadata, stop and start the database or other dependent cluster components, get the list of patches already applied, get list of bugs that are fixed by a previous patch, get list of participating nodes in a clustered environment, copy binaries from and old path to a new path in the case of transparent upgrades, find software version information relating to patching components, etc. The patching server 102 may determine that a plurality of commands are required to finish patching activity by parsing the output file generated at the client database 106. If such a determination is made, the patching server 102 may generate a new configuration file based on the patching instructions related to the patching request, and transmit the new configuration file to the client database 106 via data connection 110. This process may be repeated until the patching server 102 determines that the output file generated from at the client database 106 no longer requires additional patching activity.

If errors associated with patching activity are identified from the output file, patching server 102 may terminate the patching process. In some embodiments, when errors are detected, patching server 102 may generate and transmit a notification to the patching controller 104, which may then generate a notification or other communication for display at user interface 112. If no errors are detected, and it is determined that no additional patching activity is required, the patching process is completed and a notification or message may be generated and transmitted to user interface 112 for display to a user 113.

By separating the data passing and the command execution, the system 100 prevents unauthorized users from obtaining access to the patching process, at either the patching server 102 or the client database 106. In prior systems, database patching was accomplished through a direct SSH link between patching server and client database. As previously discussed, SSH connections may have been disallowed due to security protocols or regulations. SSH connections may have also allowed password-less direct access between servers. This presented security vulnerabilities between a patching server and client database. In one aspect of the present disclosure, bifurcating the data exchange and command execution, the security vulnerabilities are limited to the patching controller 104, which is configured with additional security features, such as limiting the number of active users or requiring multifactor authentication. Furthermore, patching controller 104 is more secure as it is controlled by a single administrator or organization.

Figure 2:
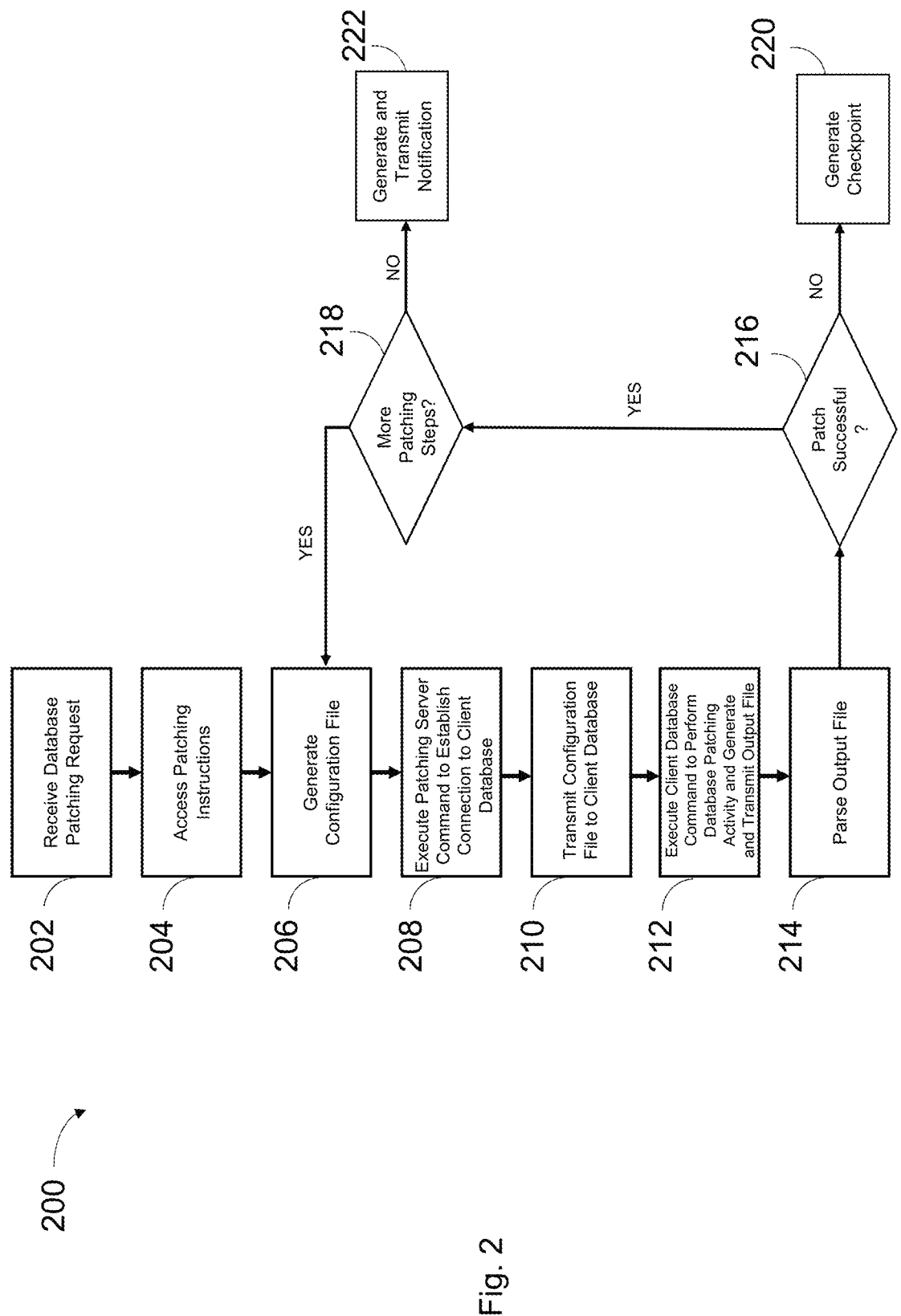
FIG. 2 shows a flow chart according to an exemplary improved database patching method; and, FIG. 3 shows an exemplary data flow between a patching server and client database according to the exemplary database patching system of FIG. 1.

FIG. 2 shows an exemplary method 200 for improved database patching. It will be appreciated that the illustrated method and associated steps may be performed in a different order and/or in parallel, with illustrated steps omitted, with additional steps added, or with a combination of reordered, combined, omitted, or additional steps.

At step 202, a database patching request is received. In certain embodiments, the database patching request is generated via a user interface, e.g. user interface 112. Step 204 comprises accessing patching instructions related to the database patching request. The patching instructions may comprise instructions, e.g. executable code or commands, directed to specific execution at either the patching server side, e.g. patching server 102, or the client side, e.g. client database 106. Step 206 comprises generating a configuration file based on the patching instructions. The configuration file may be generated at the patching server, e.g. patching server 102. Step 208 comprises executing a patching server command associated with the configuration file and the patching instructions. When executed, the patching server command may establish a secure and direct connection between the patching server and the client database. At step 210, the configuration file is transmitted to the client database. Step 212 comprises executing a client database command which may cause the client database to perform at least one database patching activity and generate and transmit an output file related to the patching activity. At step 214, the patching servers may parse the output file and determine if patching activities were successful at step 216. If the patch was successful, the patching servers may determine if additional patching steps are required at step 218. In some embodiments, the patching servers determine if additional patching is required based on the patching instructions. If additional patching is required, the method 200 may repeat by returning to step 206 where a new configuration file may be generated. If a patch was unsuccessful, for example, because of one or more errors, a checkpoint may be generated at step 220. The checkpoint may be used reinitiate the failed patching attempt at a different time. The checkpoint may also be used to record error information which may be analyzed to determine the point of failure. It will be appreciated that this repetition of method 200 may occur a plurality of times until it is determined that no additional patching is required. At step 218, if no additional patching activities are required, the patching process is complete and the method proceeds to step 222 where a notification or message may be generated and transmitted to, for example, user interface 112 for display to a user 113.

Figure 3:
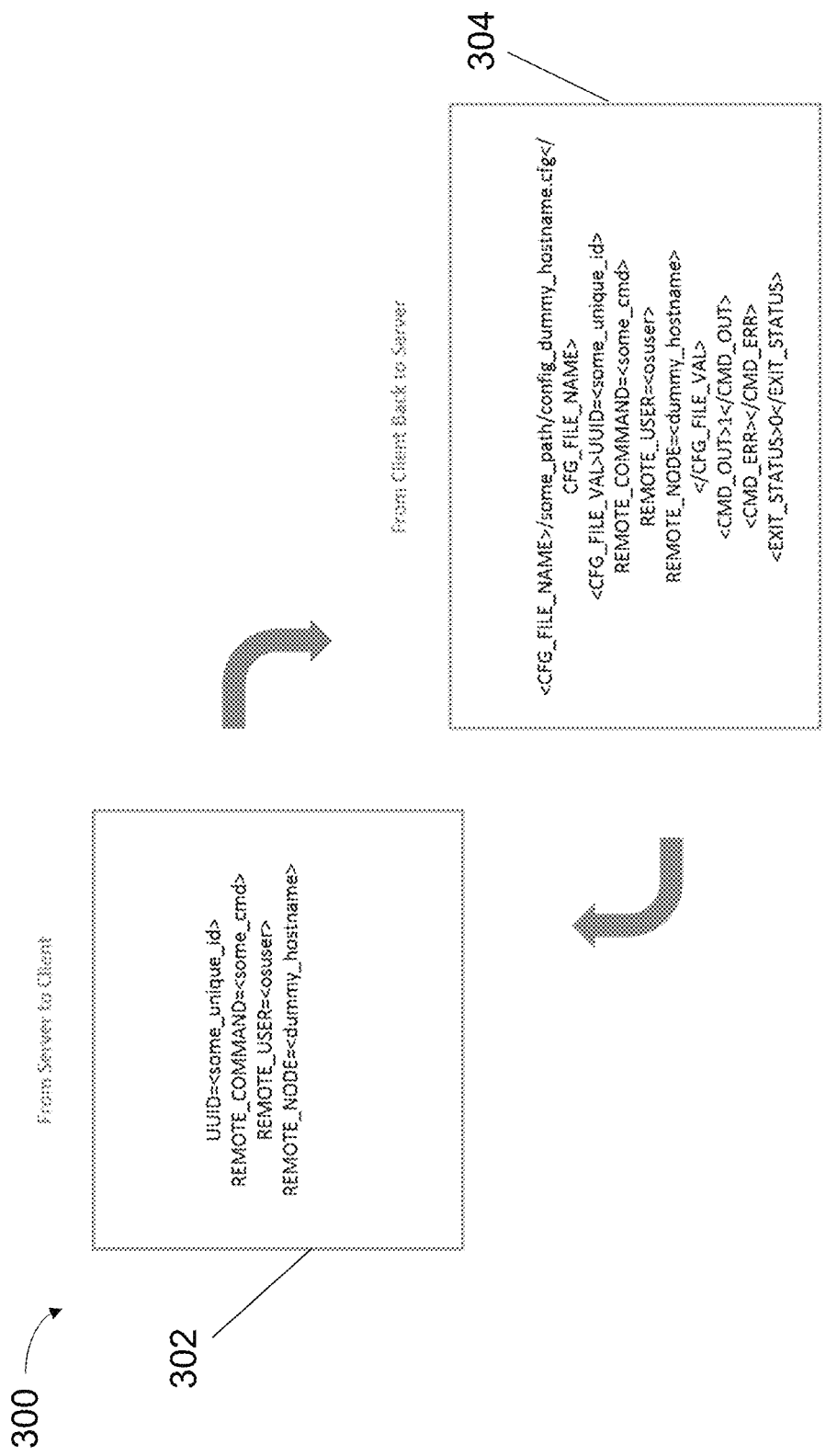

FIG. 3 shows an exemplary data flow 300 between a patching server and client database according to the exemplary database patching system, e.g. system 100. Configuration file 302 comprises information relating to a patching command, such as, for example, the command, the target user, and the target node. When the configuration file 302 is passed to the client database and patching activities are performed, output file 304 may be generated. The information associated with the output file 304 may comprise the same information as the configuration file 302 as well as additional information, such as, for example, data describing the configuration file 302, the result of a command associated with the configuration file 302, error information, etc. It will be appreciated that the information shown in configuration file 302 and output file 304 is offered by way of example only.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

What is claimed is:

1. A method of database patching, the method comprising:
generating, with a patching server, a configuration file based on patching instructions from a patching controller that is a separate device from the patching server, wherein the configuration file comprises at least a first patching server command and a first client database command;
receiving, with the patching controller, a database patching request from a user computer having a user interface for entering a database patching request;
accessing, with the patching controller, the patching instructions related to the database patching request;
transmitting the patching instructions from the patching controller to the patching server, thereby causing the patching server to generate the configuration file based on the patching instructions;
triggering, with the patching controller, executing of the first client database command by the patching server;
executing, with the patching server, the first patching server command triggered by the patching controller, which causes the patching server to establish a direct connection to a client database and transmit the configuration file to the client database;
executing, with the patching server, of the first client database command causing the client database to:
perform at least one database patching activity;
generate a patching output file based on the database patching activity; and,
transmit the patching output file to the patching server;
wherein the patching controller receives the database patching request, accesses the patching instructions, and triggers execution of the first client database command, while the patching server generates and transmits the configuration file to the client database, thereby allocating to different devices i) the generating of the configuration file and transmitting the configuration file to the client database, and ii) receiving the database patching request, the accessing of the patching instructions, and triggering execution of the first database command; and
parsing the patching output file at the patching server.

2. The method of claim 1, wherein parsing the patching output file at the patching server further comprises determining if additional patching activity is required.

3. The method of claim 2, wherein if additional patching activity is required, generating, with the patching server, a second configuration file based on the patching instructions.

4. The method of claim 3, further comprising:
executing a second patching server command which causes the patching server to transmit the second configuration file to the client database via the direct connection;
executing a second client database command which causes the client database to:
perform at least one database patching activity;
generate a second patching output file based on the database patching activity; and,
transmit the second patching output file to the patching server.

5. The method of claim 1, wherein parsing the patching output file at the patching server further comprises determining if the patch was successful.

6. The method of claim 1, further comprising transmitting a notification to a user via the user interface to indicate patching is completed.

7. The method of claim 1, further comprising verifying a user's entitlements to determine if a user is permitted to submit the database patching request.

8. The method of claim 7, wherein the database patching request is received via a secure shell (SSH) connection at the patching controller.

9. The method of claim 1, wherein the patching controller triggers execution of the first patching server command to establish the direct connection between the patching server and the client database by connecting socket level endpoints between the patching server and the client database.

10. The method of claim 1, further comprising
configuring the patching controller with security features including
limiting the number of active users, or
requiring multifactor authentication, and
controlling the patching controller with a single administrator or organization.

11. A system for database patching, the system comprising:
a patching controller; and
a patching server, which is a separate device from the patching controller, configured to generate a configuration file based on patching instructions from the patching controller, wherein the configuration file comprises at least a first patching server command and a first client database command; and
the patching controller comprising a computer configured to:
receive a database patching request from a user computer having a user interface for entering a database patching request;

access the patching instructions related to the database patching request;

transmit the patching instructions to the patching server, causing the patching server to generate the configuration file based on the patching instructions; and trigger execution of the first client database command by the patching server, which causes the patching server to establish a direct connection to a client database and transmit the configuration file to the client database;

triggering of execution of the first client database command causing the client database to:
perform at least one patching activity;
generate a patching output file based on the database patching activity; and
transmit the patching output file to the patching server, causing the patching server to parse the patching output file, wherein the patching controller receives the database patching request, accesses the patching instructions, and triggers execution of the first client database command, while the patching server generates and transmits the configuration file to the client database, thereby allocating to different devices i) the generating of the configuration file and transmitting the configuration file to the client database, and ii) receiving the database patching request, the accessing of the patching instructions, and triggering execution of the first client database command.

12. The system of claim 11, wherein parsing the patching output file at the patching server further comprises determining if additional patching activity is required.

13. The system of claim 12, wherein if addition patching activity is required, the patching controller is further configured to trigger generation of a second configuration file at the patching server.

14. The system of claim 13, wherein the patching controller is further configured to trigger execution of a second patching server command which causes the patching server to transmit the second configuration file to the client database via the direct connection.

15. The system of claim 14, wherein the patching controller is further configured to trigger execution of a second client database command which causes the client database to:
perform at least one additional database patching activity;
generate a second patching output file based on the additional database patching activity; and,
transmit the second patching output file to the patching server.

16. The system of claim 11, wherein parsing the patching output file at the patching server further comprises determining if the patch was successful.

17. The system of claim 11, wherein the patching controller is further configured to transmit a notification to a user via the user interface to indicate patching is completed.

18. The system of claim 11, wherein the patching controller is further configured to verify a user's entitlements to determine if the user is permitted to submit a database patching request.

19. The system of claim 11, wherein the database patching request is received via a secure shell (SSH) connection between the patching controller and the user interface.

20. The system of claim 11, wherein the patching controller triggers execution of the first patching server command to establish the direct connection between the patching server and the client database by connecting socket level endpoints between the patching server and the client database.

* * * * *